US008862942B2

(12) United States Patent  (10) Patent No.: US 8,862,942 B2
Jalbert et al.  (45) Date of Patent: Oct. 14, 2014

(54) METHOD OF SYSTEM FOR DETECTING ABNORMAL INTERLEAVINGS IN CONCURRENT PROGRAMS

(75) Inventors: Nicholas A. Jalbert, Berkeley, CA (US); Cristiano L. Pereira, Groveland, CA (US); Gilles A. Pokam, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/498,613

(22) PCT Filed: Sep. 29, 2011

(86) PCT No.: PCT/US2011/054081
§ 371 (c)(1),
(2), (4) Date: Mar. 28, 2012

(87) PCT Pub. No.: WO2012/087402
PCT Pub. Date: Jun. 28, 2012

(65) Prior Publication Data
US 2013/0297978 A1 Nov. 7, 2013

Related U.S. Application Data

(60) Provisional application No. 61/426,943, filed on Dec. 23, 2010.

(51) Int. Cl.
*G06F 11/00* (2006.01)
*G06F 11/36* (2006.01)
*G06F 11/14* (2006.01)
*G06F 9/38* (2006.01)

(52) U.S. Cl.
CPC ........ *G06F 11/1479* (2013.01); *G06F 11/3632* (2013.01); *G06F 9/3851* (2013.01)

USPC ............... 714/38.1; 714/11; 714/25; 714/37; 714/39

(58) Field of Classification Search
CPC ........... G06F 11/3604; G06F 11/3466; G06F 11/323; G06F 11/0766; G06F 11/3072; G06F 11/3409
USPC ................................ 714/38.1, 25, 37, 11, 39
See application file for complete search history.

(56) References Cited

U.S. PATENT DOCUMENTS 4,371,932 A * 2/1983 Dinwiddie et al. ............. 710/21
6,405,326 B1 * 6/2002 Azagury et al. ............. 714/38.1

(Continued)

FOREIGN PATENT DOCUMENTS

WO    2012087402 A1    6/2012

OTHER PUBLICATIONS

PCT Search Report and Written Opinion prepared for PCT/US2011/054081, mailed Mar. 2, 2012.

(Continued)

*Primary Examiner* — Loan L. T. Truong
(74) *Attorney, Agent, or Firm* — Barnes & Thornburg, LLP

(57) ABSTRACT

A method and system for detecting abnormal interleavings in a multi-threaded program includes generating an execution log in response to execution of the multi-threaded program. Based on the execution log, a list of allowable immediate interleavings is generated if the execution of the multi-threaded program resulted in no concurrency errors and a list of suspicious immediate interleavings is generated if the execution of the multi-threaded program resulted in one or more concurrency errors. The first and second lists are compared to generate a list of error-causing immediate interleavings. A replayable core is then generated and executed based on the list of error-causing immediate interleavings.

23 Claims, 4 Drawing Sheets

(56) References Cited

U.S. PATENT DOCUMENTS

| | | | |
|---|---|---|---|
| 6,851,075 B2 * | 2/2005 | Ur et al. | 714/36 |
| 7,318,114 B1 * | 1/2008 | Cypher | 711/3 |
| 7,320,114 B1 | 1/2008 | Jain et al. | |
| 7,370,243 B1 * | 5/2008 | Grohoski et al. | 714/48 |
| 7,574,697 B2 * | 8/2009 | Biberstein et al. | 717/130 |
| 7,657,872 B2 * | 2/2010 | Kelbaugh et al. | 717/124 |
| 7,685,573 B2 * | 3/2010 | Kang et al. | 717/128 |
| 7,712,081 B2 * | 5/2010 | Biberstein et al. | 717/124 |
| 7,747,996 B1 * | 6/2010 | Dice | 717/169 |
| 7,793,263 B2 * | 9/2010 | Farchi et al. | 717/126 |
| 8,224,614 B2 * | 7/2012 | Adir et al. | 702/119 |
| 8,572,581 B2 * | 10/2013 | Shafi et al. | 717/131 |
| 2001/0014941 A1 | 8/2001 | Akkary et al. | |
| 2002/0143575 A1 | 10/2002 | Hansen et al. | |
| 2003/0097653 A1 * | 5/2003 | Kim et al. | 717/160 |
| 2003/0131282 A1 | 7/2003 | Lowen et al. | |
| 2005/0086648 A1 * | 4/2005 | Andrews et al. | 717/135 |
| 2009/0044174 A1 * | 2/2009 | Dolby et al. | 717/127 |
| 2009/0106740 A1 * | 4/2009 | Chockler et al. | 717/127 |
| 2010/0070740 A1 * | 3/2010 | Allen et al. | 712/30 |
| 2010/0107017 A1 * | 4/2010 | Munjal et al. | 714/49 |
| 2010/0125758 A1 * | 5/2010 | Yang et al. | 714/45 |
| 2010/0251160 A1 * | 9/2010 | Shafi et al. | 715/772 |
| 2011/0138236 A1 * | 6/2011 | Park et al. | 714/57 |
| 2011/0225592 A1 * | 9/2011 | Goldin | 718/104 |

OTHER PUBLICATIONS

International Preliminary Report on Patentability received for International Application No. PCT/US2011/054081, mailed on Jul. 4, 2013, 6 pages.

\* cited by examiner

METHOD OF SYSTEM FOR DETECTING ABNORMAL INTERLEAVINGS IN CONCURRENT PROGRAMS

CROSS-REFERENCE TO RELATED APPLICATION

The present application is a national stage entry under 35 USC §371(b) of International Application No. PCT/US2011/054081 filed Sep. 29, 2011, which claims priority under 35 U.S.C. §119(e) to U.S. Provisional Application Ser. No. 61/426,943, entitled "METHOD AND SYSTEM FOR DETECTING ABNORMAL INTERLEAVINGS IN CONCURRENT PROGRAMS," which was filed on Dec. 23, 2010.

BACKGROUND

Many current computers and computing devices utilize multicore technology. In order to obtain the maximum benefit of the multicore technology, newer software programs are implemented as parallel programs capable of being executed using multi-threading. However, with the increased parallelism of such programs, the non-determinism associated with the programs likewise increases. Non-determinism of software programs complicates the development cycle. In particular, some parallel programs may suffer from concurrency errors, typically known as "concurrency bugs" during execution.

Concurrency errors further complicate the development of parallel programs because such errors are difficult to reproduce. The parallelism of multi-threaded programs can result in concurrency bugs that only materialize under very specific conditions. For example, in some cases, the concurrency bug may not occur even with identical input. The inability to reproduce consistently the concurrency bug substantially increases the difficulty of debugging the software program. Additionally, even in the rare cases in which such concurrency bugs can be occasionally reproduced, the non-determinism of the concurrency errors makes those errors resistant to typical cyclic debugging techniques, which can be effective in debugging non-parallel programs.

BRIEF DESCRIPTION OF THE DRAWINGS

The systems, devices, and methods described herein are illustrated by way of example, and not by way of limitation, in the accompanying figures. For simplicity and clarity of illustration, elements illustrated in the figures are not necessarily drawn to scale. For example, the dimensions of some elements may be exaggerated relative to other elements for clarity. In the following figures.

DETAILED DESCRIPTION OF THE DRAWINGS

Figure 1:
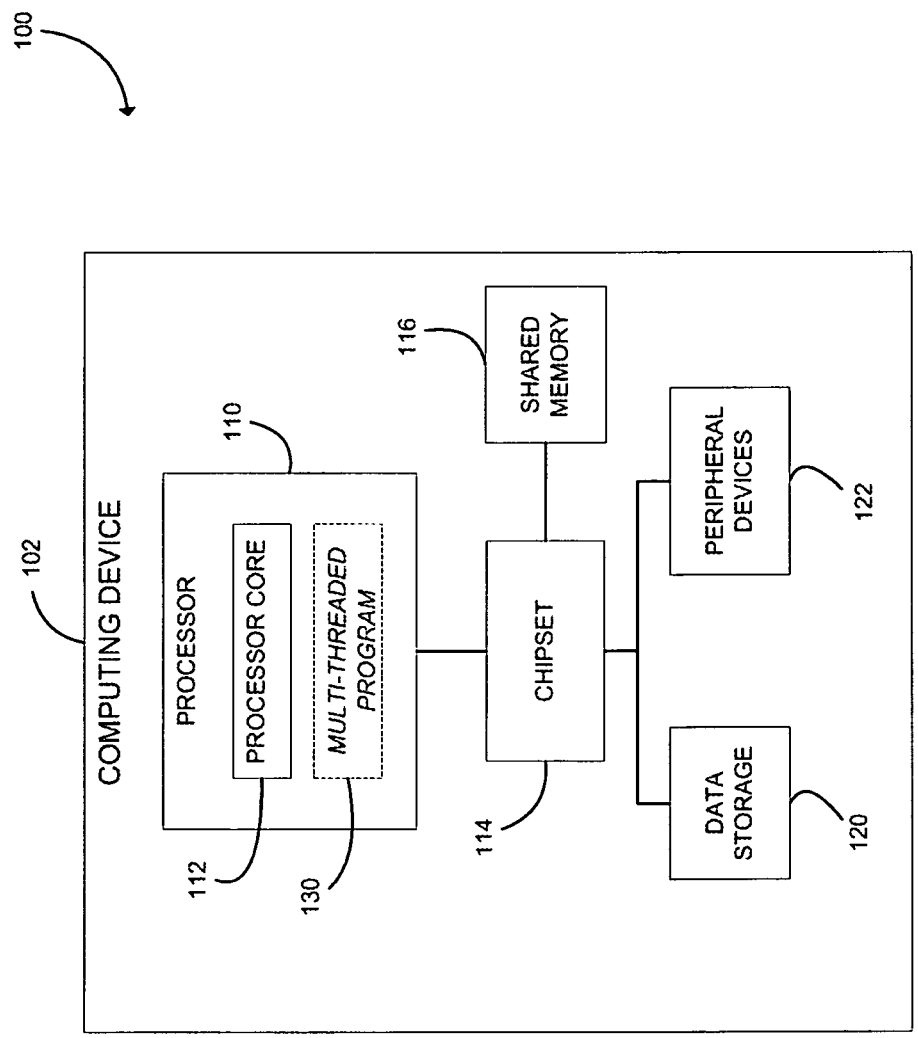
FIG. 1 is a simplified block diagram of at least one embodiment of a computing device for detecting abnormal interleavings in a multi-threaded program.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices may be set forth in order to provide a more thorough understanding of the present disclosure. It will be appreciated, however, by one skilled in the art that embodiments of the disclosure may be practiced without such specific details. In other instances, control structures, gate level circuits, and full software instruction sequences may have not been shown in detail in order not to obscure the disclosure. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions stored on one or more non-transitory, machine-readable media, which may be read and executed by one or more processors. A non-transitory, machine-readable medium may include any non-transitory mechanism for storing or transmitting information in a form readable by a machine (e.g., a computing device). For example, a non-transitory, machine-readable medium may include any one or combination of read only memory (ROM); random access memory (RAM); magnetic disk storage media; optical storage media; flash memory devices; and others.

Referring now to FIG. 1, a system 100 for detecting abnormal interleavings in a multi-threaded program includes a computing device 102. The computing device 102 is configured to execute a parallel or multi-threaded program 130 and detect abnormal interleavings (i.e., sequential instruction sets that cause a concurrency error) in the multi-threaded program 130 by comparing a list of suspicious immediate interleavings with a list of allowable immediate interleavings as discussed in more detail below in regard to FIGS. 2-4. The computing device 102 may be embodied as any type of electronic device capable of performing the functions described herein. For example, the computing device 102 may be embodied as a personal computer, a workstation, a laptop computer, a handheld computer, a mobile internet device, a cellular phone, a personal data assistant, a telephony device, a network appliance, a virtualization device, a storage controller, or other computer-based device.

In the illustrative embodiment of FIG. 1, the computing device 102 includes a processor 110, a chipset 114, and a shared memory 116. In some embodiments, the computing device 102 may also include one or more data storage devices 120 and/or one or more additional peripheral devices 122. Additionally, in some embodiments, several of the foregoing components may be incorporated on a motherboard of the computing device 102, while other components may be communicatively coupled to the motherboard via, for example, a peripheral port. Furthermore, it should be appreciated that the computing device 102 may include other components, subcomponents, and devices commonly found in a computer and/or computing device, which are not illustrated in FIG. 1 for clarity of the description.

The processor 110 of the computing device 102 may be embodied as any type of processor capable of executing parallel or multi-threaded programs, such as a microprocessor, digital signal processor, microcontroller, or the like. The processor 110 is illustratively embodied as a single core processor having a processor core 112. However, in other embodiments, the processor 110 may be embodied as a multi-core processor having multiple processor cores 112. Additionally, the computing device 102 may include additional processors 110 having one or more processor cores 112.

The chipset 114 of the computing device 102 may include a memory controller hub (MCH or "northbridge"), an input/output controller hub (ICH or "southbridge"), and a firmware device. In such embodiments, the firmware device may be embodied as a memory storage device for storing Basic Input/Output System (BIOS) data and/or instructions and/or other information. Of course, in other embodiments, chipsets having other configurations may be used. For example, in some embodiments, the chipset 114 may be embodied as a platform controller hub (PCH). In such embodiments, the memory controller hub (MCH) may be incorporated in or otherwise associated with the processor 110.

The chipset 114 is communicatively coupled to the processor 110 via a number of signal paths. These signal paths (and other signal paths illustrated in FIG. 1) may be embodied as any type of signal paths capable of facilitating communication between the components of the computing device 102. For example, the signal paths may be embodied as any number of wires, cables, light guides, printed circuit board traces, via, bus, intervening devices, and/or the like.

The shared memory 116 of the computing device 102 is also communicatively coupled to the chipset 114 via a number of signal paths. The memory 128 may be embodied as one or more memory devices or data storage locations including, for example, dynamic random access memory devices (DRAM), synchronous dynamic random access memory devices (SDRAM), double-data rate synchronous dynamic random access memory device (DDR SDRAM), flash memory devices, and/or other volatile memory devices. Additionally, although only a single memory device 116 is illustrated in FIG. 1, in other embodiments, the computing device 102 may include additional memory devices. The shared memory 116 is accessible by each thread being executed on the processor 110. Such memory accesses by the various threads can cause concurrency error or bugs as discussed in more detail below.

As discussed above, the computing device 102 may also include one or more data storage devices 120 and one or more peripheral devices 122. In such embodiments, the chipset 114 is also communicatively coupled to the one or more data storage devices 120 and the one or more peripheral devices 122. The data storage device(s) 120 may be embodied as any type of device or devices configured for the short-term or long-term storage of data such as, for example, memory devices and circuits, memory cards, hard disk drives, solid-state drives, or other data storage devices. The peripheral device(s) 122 may include any number of peripheral devices including input devices, output devices, and other interface devices. For example, the peripheral devices 122 may include a display, mouse, keyboard, and external speakers of the computing device 102.

As discussed above, the computing device 102 is configured to detect abnormal interleavings in the multi-threaded program 130. To do so, the computing device 102 repeatedly executes the program 130 to build a list of allowable immediate interleavings and a list of suspicious immediate interleavings. A final list of error-causing immediate interleavings is then generated by comparing the list of suspicious immediate interleavings to the list of allowable immediate interleavings and removing those immediate interleavings found to be included in the list allowable immediate interleaving from the list of suspicious interleavings. A repeatable core is generated based on the list of error-causing immediate interleavings and is repeatedly executed to confirm the validity of each error-causing immediate interleaving.

Figure 2:
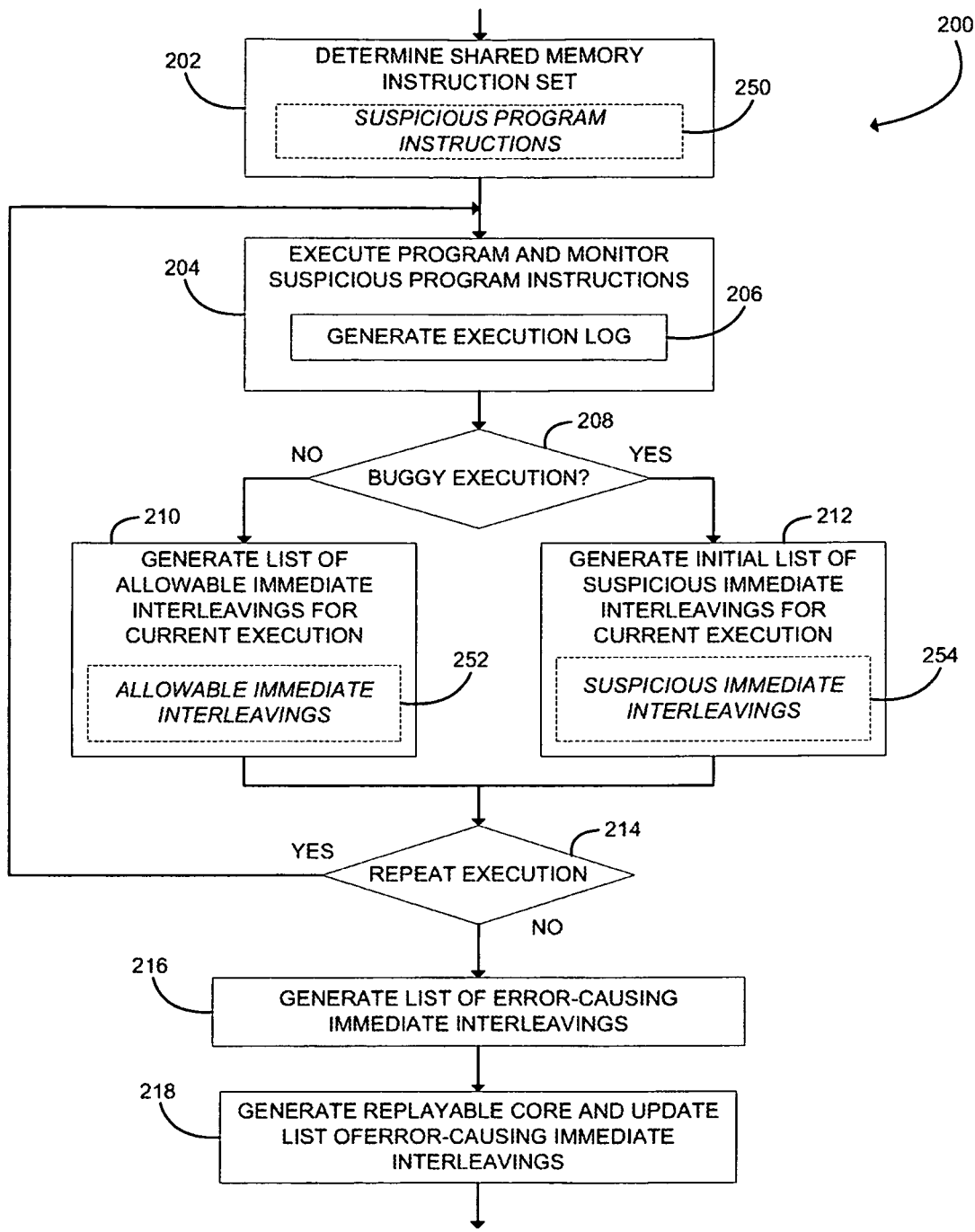
FIG. 2 is a simplified flow diagram of at least one embodiment of a method for detecting abnormal interleavings in a multi-threaded program.

Referring now to FIG. 2, the computing device 102 may execute a method 200 for detecting abnormal interleavings. The method 200 begins with block 202 in which the multi-threaded program 130 is examined to identify those instructions that access a shared memory location. The analysis of block 202 may be performed "offline." That is, the shared memory instructions may be determined prior to program testing. For example, in one particular embodiment, a dynamic race detection algorithm may be used on a single execution of the program to generate an approximate set of shared memory instructions. It should be appreciated that the instructions that access a shared memory location represent those instructions having the ability to cause a concurrency error. As such, each of the instructions identified as accessing shared memory locations are included in a suspicious program instructions list 250.

In block 204, the program 130 is executed in a multi-threaded environment and the instructions included in the suspicious program instructions list 250 are monitored. As discussed below, the program 130 may be executed multiple times. Based on each execution of the program 130, an execution log is generated. Each execution log identifies when each instruction is executed and the thread executing each respective instruction. For example, in the illustrative embodiment, each execution log includes a plurality of log entries. Each log entry includes a time stamp that identifies the time at which an associated instruction was executed, an identification of the respective instruction, and an identification of the thread that executed the respective instruction. As discussed below, the list of allowable immediate interleavings and the list of suspicious immediate interleavings is generated based on the execution logs.

In block 208, the computing device 102 determines if the current execution of the program 130 resulted in any concurrency errors (i.e., a "buggy execution"). If not, the method 200 advances to block 210 in which a list of allowable immediate interleavings 252 is generated based on the current execution log. To do so, for each timestamp, k, in the current execution log, the thread, $t_k$, that executed the instruction, $i_k$, is examined. The list of allowable immediate interleavings 252 may be generated by recording, for each thread other than the examined thread, $t_k$, of the multi-threaded execution of the program 130, each instruction, $i_{prev}$, executed immediately prior to the execution of the examined instruction, $i_k$. The instructions, $i_{prev}$ and $i_k$, form an immediate interleaving, which is deemed allowable based on the non-failing execution of the program 130 (i.e., no concurrency errors were experienced). As such, each allowable immediate interleaving identifies a pair of instructions including a first instruction, $i_{prev}$, that may be executed immediately prior to a second instruction, $i_k$, without causing a concurrency error. It should be appreciated that "immediately prior to" refers to the sequential order of the first and second instructions, and not to a temporal association. That is, the first instruction is executed prior to the second instruction with no intervening instructions, but may be executed at any time prior to the second instruction.

Referring back to block 208, if the computing device 102 determines that the execution of the program 130 resulted in concurrency errors, the method 200 advances to block 212 in which a list of suspicious immediate interleavings 254 is generated based on the current execution log. The list of suspicious immediate interleavings 254 is generated in a manner similar to that used to generate the list of allowable immediate interleavings 252 discussed above. In particular, the list of suspicious immediate interleavings 254 may be generated by recording, for each thread other than the examined thread, $t_k$, of the multi-threaded execution of the program 130, each instruction, $i_{prev}$, executed immediately prior to the execution of the examined instruction, $i_k$. The instructions, $i_{prev}$ and $i_k$, form an immediate interleaving, which is deemed suspicious based on the failing execution of the program 130. As such, each suspicious immediate interleaving identifies a pair of instructions including a first instruction, $i_{prev}$, that if executed immediately prior to a second instruction, $i_k$, may (or may not) cause a concurrency error.

After the generation of the list of allowable immediate interleavings 252 or the list of suspicious immediate interleavings 254 (depending on the state of execution of the program 130), the method 200 advances to block 214. In block 214, the computing device 102 determines whether an additional execution of the program 130 is desired. As discussed above, the program 130 may be executed any number of times. It should be appreciated, however, that likelihood of detecting abnormal interleaves is increased by increasing the number of executions of the program 130. The particular number of execution times may be predetermined, selected by a user of the computing device 102 prior to execution of the method 200, or dynamically determined based on the current results of the method 200 (e.g., the size of the lists 252, 254).

If the computing device 102 determines that additional executions are required, the method 200 loops back to block 204 in which the program 130 is again executed. However, if the computing device 102 determines that no additional executions are required, the method 200 advances to block 216 in which a list of error-causing immediate interleavings is generated. The list of error-causing immediate interleavings includes those immediate interleavings suspected of causing a concurrency error in the execution of the program 130 as discussed below. The list of error-causing immediate interleavings is generated based on the list of suspicious immediate interleavings 254 and the list of allowable immediate interleavings 252. That is, the list of error-causing immediate interleavings is generated by comparing the list of suspicious immediate interleavings 254 to the list of allowable immediate interleavings 252. For example, in one particular embodiment, each immediate interleaving included in the list of suspicious immediate interleavings 254 is compared to the list of allowable immediate interleavings 252. If the respective immediate interleaving is found to be included in the list of allowable immediate interleavings 252, that immediate interleaving is assumed to not be the cause of the concurrency bug and is ignored. However, if the immediate interleaving is not found to be included in the list of allowable immediate interleavings 252, that immediate interleaving is added to the list of error-causing immediate interleavings in block 216. That is, each suspicious immediate interleaving is deemed to be error-causing if it is not found to be listed as an allowable immediate interleaving. As discussed below, the list of error-causing immediate interleaving may be further refined based on executions of a replayable core.

It should be appreciated that in some cases the concurrency error may only occur if multiple immediate interleavings are respected in a single execution. That is, the concurrency error may only occur if a first instruction is executed immediately prior to a second instruction and a third instruction is executed immediately prior to a fourth instruction, and so on. The number of immediate interleavings that must be respected defines a parameter typically referred to as the bug depth. That is, the bug depth identifies the number of immediate interleavings that must be respected in a single execution to produce the concurrency error.

Figure 3:
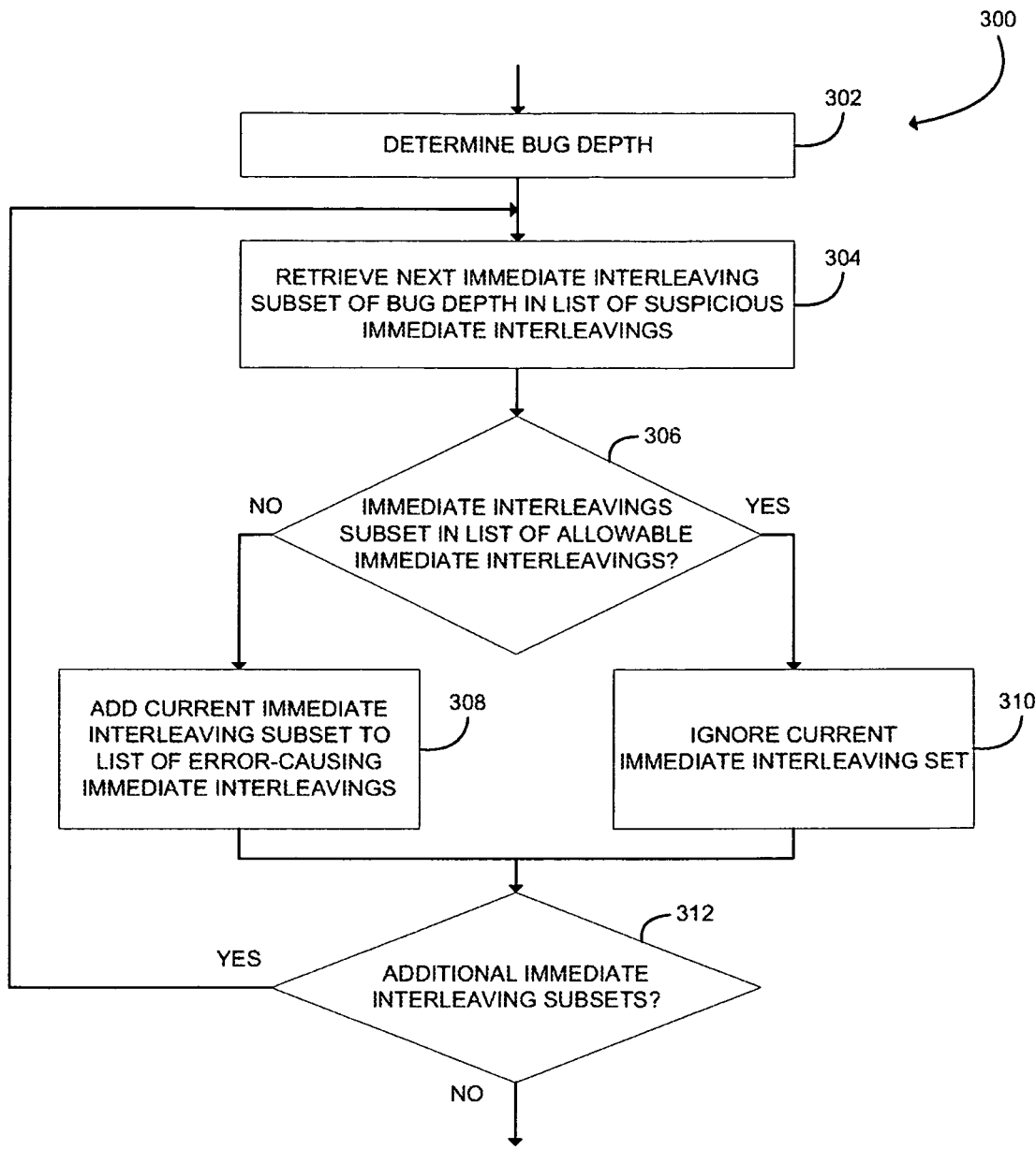
FIG. 3 is a simplified flow diagram of at least one embodiment of a method for generating a list of error-causing immediate interleavings.

In cases in which the concurrency error is believed to have a bug depth greater than one, each permutation of immediate interleavings subsets having a number of immediate interleavings equal to the desired bug depth is compared to the list of allowable immediate interleavings. To do so, the computing device 102 may execute a method 300 for generating a list of error-causing immediate interleavings as illustrated in FIG. 3. The method 300 begins with block 302 in which the bug depth is determined. As discussed above, the bug depth identifies the number of immediate interleavings that must be respected in a single execution to produce the concurrency error. The bug depth may be predetermined, supplied by a user of the computing device 102, or dynamically determined based on other criteria.

In block 304, the next immediate interleaving subset of the list of suspicious immediate interleavings 254 is retrieved and examined. As discussed above, the selected immediate interleaving subset includes a number of immediate interleavings equal to the bug depth. It should be appreciated that the number of immediate interleaving subsets of the list of suspicious immediate interleavings 254 having the determined bug depth may be approximated based on the following equation:

$$(\text{buggy immediate interleavings})^{bug\_depth}$$

wherein "buggy immediate interleavings" is the number of immediate interleavings included in the list of suspicious immediate interleavings 254 and "bug_depth" is the bug depth determined in block 302.

In block 306, the computing device 102 determines whether the currently retrieved immediate interleaving subset is not included in the list of allowable immediate interleavings 252. If so, the method 300 advances to block 308 in which the immediate interleaving subset is added to the list of error-causing immediate interleavings. However, if the currently retrieved immediate interleaving subset is included in the list of allowable immediate interleavings 252, the immediate interleaving subset is ignored in block 310 (i.e., not added to the list of error-causing immediate interleavings).

After the currently retrieved immediate interleaving subset has been analyzed in blocks 308, 310, the method 300 advances to block 312 in which the computing device 102 determines whether there are any remaining immediate interleaving subsets of the determined bug depth in the list of the list of suspicious immediate interleavings 254. If so, the method 300 loops back to block 304 in which the next immediate interleaving subset is retrieved and examine. In this way, each permutation of each immediate interleaving subset of the list of suspicious immediate interleavings 254 is analyzed and compared to the list of allowable immediate interleavings 252. It should be appreciated the algorithm represented in the method of 300 has a complexity proportional to the following equation:

$$(\text{allowable immediate interleavings}) * (\text{number of immediate interleavings})^{bug\_depth}$$

wherein "allowable immediate interleavings" is the number of immediate interleavings included in the list of allowable immediate interleavings 252, "number of immediate interleavings" is the number of immediate interleavings included in the list of suspicious immediate interleavings 254, and "bug_depth" is the bug depth determined in block 302.

Referring now back to method 200 of FIG. 2, after the list of error-causing immediate interleavings has been generated in block 216, the method 200 advances to block 218 in which a replayable core is generated and executed. Based on the execution of the replayable core, the list of error-causing immediate interleavings is updated resulting in a final list of error-causing immediate interleavings that may be further analyzed, removed from the program 130, and/or otherwise corrected.

Figure 4:
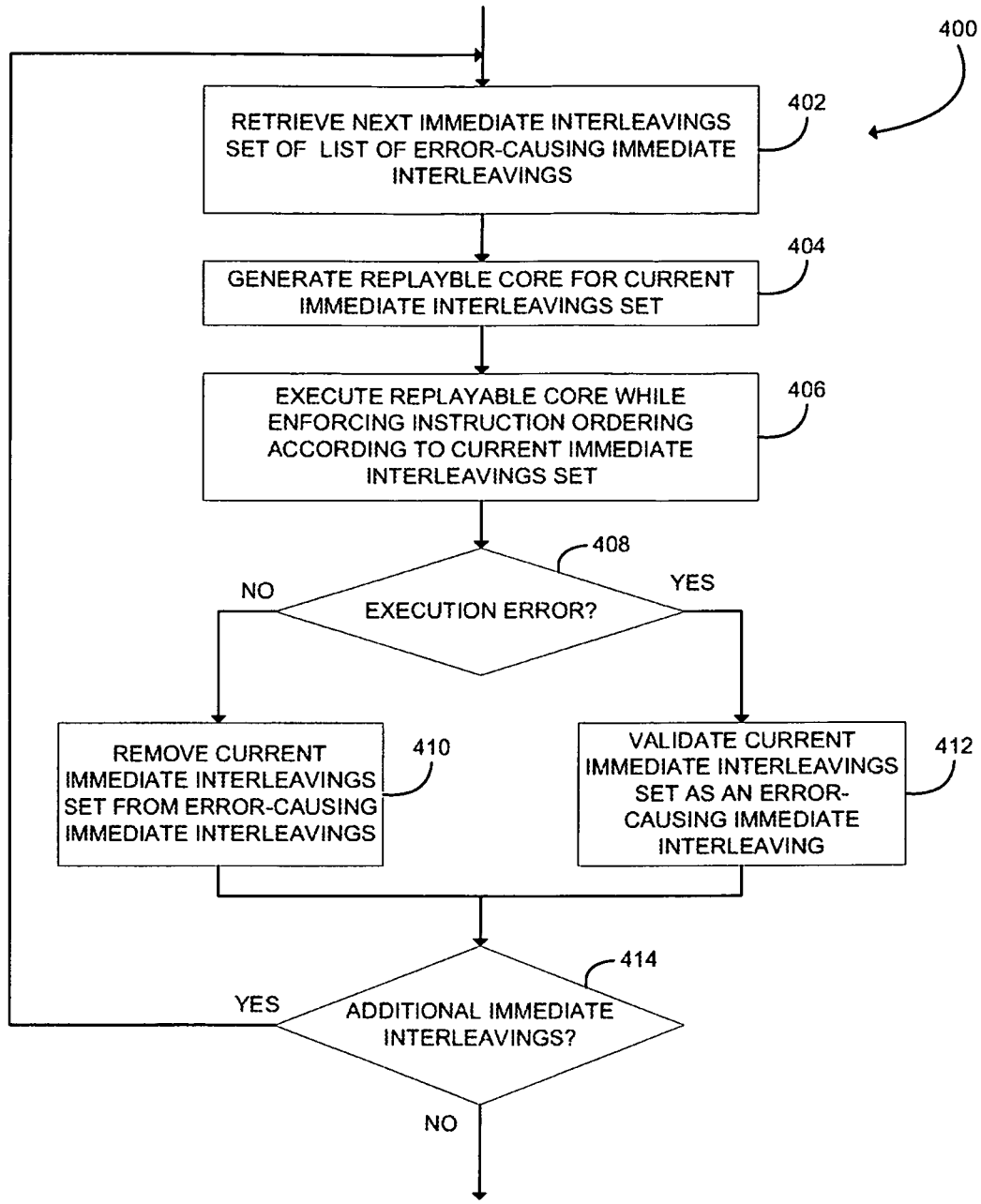
FIG. 4 is a simplified flow diagram of at least one embodiment of a method for generating and executing a replayable core based on a list of error-causing immediate interleavings.

For example, as illustrated in FIG. 4, the computing device 102 may execute a method 400 for generating and executing a replayable core based on a list of error-causing immediate interleavings. The method 400 begins with block 402 in which the next immediate interleaving set of the list of error-causing immediate interleavings is retrieved and examined. As discussed above, each immediate interleaving set may include one or more immediate interleavings (i.e., have a bug depth of one or more). In block 404, a replayable core of the program 130 is generated for the current immediate interleaving set. To do so, a longest common subsequence algorithm may be applied to the execution log generated in block 206 of the method 200 to extract the portion of the program 130 that corresponds to the current suspicious immediate interleaving set.

After the replayable core is generated in block 404, the replayable core is executed in block 406. In particular, the replayable core is executed while enforcing the instruction order according to the current immediate interleaving set.

In block 408, the computing device 102 determines if an execution error (e.g., a concurrency error) occurs during the execution of the replayable core. If not, the method 400 advanced to block 410 in which the current immediate interleaving set is removed form the list of error-causing immediate interleavings. However, if an execution error is determined to have occurred during the execution of the replayable core in block 408, the method 400 advances to block 412 in which the current immediate interleaving set is confirmed as an error-causing immediate interleaving and remains in the list of error-causing immediate interleavings. After the current immediate interleaving set has been examined in blocks 410, 412, the method 400 advances to block 414 in which the computing device 102 determines whether there are any remaining immediate interleaving sets in the list of error-causing immediate interleavings. If so, the method 400 loops back to block 402 in which the next immediate interleaving set is retrieved and examined. In this way, each permutation of each immediate interleaving set of the list of error-causing immediate interleavings is analyzed at "run time" to determine whether it causes a concurrency error. As a result, the list of error-causing immediate interleavings includes those immediate interleavings sets determined to cause a concurrency error. A program developer may then further analyze the error-causing immediate interleavings, remove the error-causing immediate interleavings from the program 130, and/or otherwise correct the program 130 based on the list of error-causing immediate interleavings.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure and the appended claims are desired to be protected.

The invention claimed is:

1. A method comprising:
   generating, on a computing device, an execution log in response to an execution of a multi-threaded program;
   generating, on the computing device, a first list of allowable immediate interleavings based on the execution log in response to the execution of the multi-threaded program resulting in no concurrency errors;
   generating, on the computing device, a second list of suspicious immediate interleavings based on the execution log in response to the execution of the multi-threaded program resulting in a concurrency error; and
   generating, on the computing device, a third list of error-causing immediate interleavings based on the first and second lists.

2. The method of claim 1, wherein generating an execution log comprises generating an execution log having a plurality of entries, each entry including an associated time stamp, an identification of a first instruction executed at the time indicated by the time stamp, and an identification of a first thread of a plurality of threads of the multi-threaded program that executed the first instruction.

3. The method of claim 2, wherein generating a first list of allowable immediate interleavings comprises:
   identifying a second instruction included in the execution log, the second instruction being executed by a second thread of the plurality of threads immediately prior to the execution of the first instruction by the first thread; and
   generating an allowable immediate interleaving that identifies the execution of the second instruction immediately prior to the execution of the first instruction as being allowable.

4. The method of claim 2, wherein generating a second list of suspicious immediate interleavings comprises:
   identifying a second instruction included in the execution log, the second instruction being executed by a second thread of the plurality of threads immediately prior to the execution of the first instruction by the first thread; and
   generating a suspicious immediate interleaving set that identifies the execution of the second instruction immediately prior to the execution of the first instruction as being allowable.

5. The method of claim 1, wherein generating the first list of allowable immediate interleavings comprises generating a first list that identifies the execution of a first instruction immediately prior to the execution of a second instruction as an allowable immediate interleaving, and
   wherein generating the second list of suspicious immediate interleavings comprises generating a second list that identifies the execution of a third instruction immediately prior to the execution of a fourth instruction as potentially causing a concurrency error.

6. The method of claim 1, wherein generating the third list of error-causing immediate interleavings comprises comparing the second list of suspicious immediate interleavings to the first list of allowable immediate interleavings.

7. The method of claim 6, wherein generating the third list of error-causing immediate interleavings comprises adding a suspicious immediate interleaving included in the second list to the third list in response to the suspicious immediate interleaving not being also included in the first list of allowable immediate interleavings.

8. The method of claim 1, wherein generating the third list of error-causing immediate interleavings comprises:
   determining, for each suspicious immediate interleaving included in the second list of suspicious immediate interleavings, whether the suspicious immediate interleaving is also included in the first list of allowable immediate interleavings; and
   updating, in response to the suspicious immediate interleaving not being included in the first list, the third list of error-causing immediate interleavings to include the suspicious immediate interleaving.

9. The method of claim 1, wherein generating the third list of error-causing immediate interleavings comprises:
   determining a bug depth;
   determining a plurality of suspicious immediate interleaving sets from the second list of suspicious immediate interleavings, each suspicious immediate interleaving set including a number of suspicious immediate interleavings equal to the bug depth;
   determining, for each suspicious immediate interleaving set, whether each suspicious immediate interleaving included in the suspicious immediate interleaving set is also included in the first list of allowable immediate interleavings; and
   updating, in response to each suspicious immediate interleaving of the suspicious immediate interleaving set being not included in the first list, the third list of error-causing immediate interleavings to include the suspicious immediate interleaving set.

10. The method of claim 9, wherein determining a plurality of suspicious immediate interleaving sets comprises determining, from the second list of suspicious immediate interleaving, every permutation of suspicious immediate interleaving sets having a number of suspicious immediate interleavings equal to the bug depth.

11. The method of claim 1, further comprising:
   generating a replayable core of instructions from the multi-threaded program based on an error-causing immediate interleaving included in the third list; and
   executing the replayable core while enforcing an instruction ordering of the replayable core according to the error-causing immediate interleaving.

12. The method of claim 11, further comprising updating the third list of error-causing immediate interleavings in response to the execution of the replayable core resulting in no concurrency errors.

13. One or more non-transitory, machine readable medium comprising a plurality of instructions that, in response to being executed, result in a client computer:
   generating an execution log in response to an execution of a multi-threaded program;
   generating a first list of allowable immediate interleavings based on the execution log in response to the execution of the multi-threaded program resulting in no concurrency errors;
   generating a second list of suspicious immediate interleavings based on the execution log in response to the execution of the multi-threaded program resulting in a concurrency error;
   determining, for each suspicious immediate interleaving included in the second list, whether the respective suspicious immediate interleaving is also included in the first list of allowable immediate interleavings; and
   updating, in response to the respective suspicious immediate interleaving being not included in the first list, a third list of error-causing immediate interleavings to include the respective suspicious immediate interleaving.

14. The one or more non-transitory, machine readable medium of claim 13, wherein:
   generating an execution log comprises generating an execution log having a plurality of entries, each entry including an associated time stamp, an identification of a first instruction executed at the time indicated by the time stamp, and an identification of a first thread of a plurality of threads of the multi-threaded program that executed the first instruction, and
   wherein generating a first list of allowable immediate interleavings comprises (i) identifying a second instruction included in the execution log, the second instruction being executed by a second thread of the plurality of threads immediately prior to the execution of the first instruction by the first thread and (ii) generating an allowable immediate interleaving set that identifies the execution of the second instruction immediately prior to the execution of the first instruction as being allowable.

15. The one or more non-transitory, machine readable medium of claim 13, wherein:
   generating an execution log comprises generating an execution log having a plurality of entries, each entry including an associated time stamp, an identification of a first instruction executed at the time indicated by the time stamp, and an identification of a first thread of a plurality of threads of the multi-threaded program that executed the first instruction, and
   wherein generating a second list of suspicious immediate interleavings comprises (i) identifying a second instruction included in the execution log, the second instruction being executed by a second thread of the plurality of threads immediately prior to the execution of the first instruction by the first thread and (ii) generating a suspicious immediate interleaving set that identifies the execution of the second instruction immediately prior to the execution of the first instruction as being allowable.

16. The one or more non-transitory, machine readable medium of claim 13, wherein the plurality of instructions further result in a client computer:
   determining a bug depth;
   determining a plurality of suspicious immediate interleaving sets from the second list of suspicious immediate interleavings, each suspicious immediate interleaving set including a number of suspicious immediate interleavings equal to the bug depth;
   determining, for each suspicious immediate interleaving set, whether each suspicious immediate interleaving included in the suspicious immediate interleaving set is also included in the first list of allowable immediate interleavings; and
   updating, in response to each suspicious immediate interleaving of the suspicious immediate interleaving set being included in the first list, the third list of error-causing immediate interleavings to include the suspicious immediate interleaving set.

17. The one or more non-transitory, machine readable medium of claim 16, wherein determining a plurality of suspicious immediate interleaving sets comprises determining, from the second list of suspicious immediate interleaving, every permutation of suspicious immediate interleaving sets having a number of suspicious immediate interleavings equal to the bug depth.

18. A computing device comprising:
a processor;
a memory device electrically coupled to the processor, the memory device including therein a plurality of instructions that, when executed by the processor, result in the processor:
generating an execution log in response to an execution of a multi-threaded program;
generating a first list of allowable immediate interleavings based on the execution log in response to the execution of the multi-threaded program resulting in no concurrency errors;
generating a second list of suspicious immediate interleavings based on the execution log in response to the execution of the multi-threaded program resulting in a concurrency error;
determining a bug depth;
determining a plurality of suspicious immediate interleaving sets from the second list, each suspicious immediate interleaving set including a number of suspicious immediate interleavings equal to the bug depth;
determining, for each suspicious immediate interleaving set, whether each suspicious immediate interleaving included in the suspicious immediate interleaving set is also included in the first list; and
updating, in response to each suspicious immediate interleaving of the suspicious immediate interleaving set being not included in the first list, a third list of error-causing immediate interleavings to include the respective suspicious immediate interleaving set.

19. The computing device of claim 18, wherein generating the first list of allowable immediate interleavings comprises generating a first list that identifies the execution of a first instruction prior to the execution of a second instruction as an allowable immediate interleaving, and
wherein generating the second list of suspicious immediate interleavings comprises generating a second list that identifies the execution of a third instruction prior to the execution of a fourth instruction as potentially causing a concurrency error.

20. The computing device of claim 18, further comprising:
generating a replayable core of instructions from the multi-threaded program based on an error-causing immediate interleaving included in the third list;
executing the replayable core while enforcing an instruction ordering of the replayable core according to the error-causing immediate interleaving; and
updating the third list of error-causing immediate interleavings in response to the execution of the replayable core resulting in no concurrency errors.

21. The computing device of claim 18, wherein, wherein generating an execution log comprises generating an execution log having a plurality of entries, each entry including an associated time stamp, an identification of a first instruction executed at the time indicated by the time stamp, and an identification of a first thread of a plurality of threads of the multi-threaded program that executed the first instruction.

22. The computing device of claim 21, wherein, wherein generating a first list of allowable immediate interleavings comprises:
identifying a second instruction included in the execution log, the second instruction being executed by a second thread of the plurality of threads immediately prior to the execution of the first instruction by the first thread; and
generating an allowable immediate interleaving that identifies the execution of the second instruction immediately prior to the execution of the first instruction as being allowable.

23. The computing device of claim 18, wherein, wherein generating a second list of suspicious immediate interleavings comprises:
identifying a second instruction included in the execution log, the second instruction being executed by a second thread of the plurality of threads immediately prior to the execution of the first instruction by the first thread; and
generating a suspicious immediate interleaving set that identifies the execution of the second instruction immediately prior to the execution of the first instruction as being allowable.

* * * * *